United States Patent
Knight, III et al.

(10) Patent No.: US 6,900,795 B1
(45) Date of Patent: May 31, 2005

(54) UNITARY MOLDED LENS FILTER FOR TOUCH SCREEN INTERFACE

(76) Inventors: Jack Knight, III, 1323 Walnut Pl., Elkins, AR (US) 72727; Andrew Carlson, 15 W. Prospect St. Apt. A4, Fayetteville, AR (US) 72701; Joe Maynard, 11177 Little Elm, Farmington, AR (US) 72730

( * ) Notice: Subject to any disclaimer, the term of this patent is extended or adjusted under 35 U.S.C. 154(b) by 402 days.

(21) Appl. No.: 10/086,582

(22) Filed: Feb. 27, 2002

(51) Int. Cl.[7] ................................................ G09G 5/00
(52) U.S. Cl. ...................... 345/173; 345/156; 345/175; 345/177; 345/204; 178/18.01; 178/19.01; 348/820; 348/823; 348/824; 341/32; 250/224; 349/190; 361/681
(58) Field of Search ........................... 178/18.01, 19.01; 348/820, 823, 824; 250/224; 361/681; 312/223.2; 349/190; 341/31; 345/173, 175, 156, 177, 204

(56) References Cited

U.S. PATENT DOCUMENTS

| | | | |
|---|---|---|---|
| 5,923,319 A | 7/1999 | Bishop et al. | ............... 345/175 |
| 5,986,737 A | * 11/1999 | Evanicky et al. | ........... 349/137 |
| 6,414,728 B1 | * 7/2002 | Faris et al. | .................... 349/10 |
| 6,690,443 B1 | * 2/2004 | Poliakine | ..................... 349/152 |

* cited by examiner

Primary Examiner—Xiao Wu
Assistant Examiner—Abbas Abdulselam
(74) Attorney, Agent, or Firm—Keisling Piepert & Scott PLC; Trent C. Keisling; David B Pieper

(57) ABSTRACT

A durable unitary lens filter is provided for use with a touch sensitive display device for associated control process equipment. A front cover secures the unitary lens filter to the machine. The lens assembly includes a mounting bezel that supports an intermediate lens securing an integral rear lens filter through which a responsive display shows process information to an operator. The front cover captivates the integral bezel to secure the lens to the associated process device. The lens is molded from a semi-rigid material composition including glass fibers. An internal retainer compressibly captivates the bezel against the front cover. The bezel periphery extends substantially beyond the outermost peripheral edge of the rear lens so that forces thereto are transferred and dissipated to the machine housing.

19 Claims, 4 Drawing Sheets

UNITARY MOLDED LENS FILTER FOR TOUCH SCREEN INTERFACE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a unitary molded front cover lens filter for a touch screen interface with an associated process control device. In particular, the present invention incorporates a front cover that provides a watertight seal for a sensing control device, especially against bursts of high pressure water, while enabling operator input through a sensor adjacent a display screen. Known art may be found in U.S. Class 345, subclass 175 as well as in other classes and subclasses.

2. Description of the Prior Art

Many types of automated control systems, computer controlled systems and hybrids thereof have evolved through the years to dominate the manufacturing and processing industries in this country. Such systems have literally revolutionized industrial production and increased the speed and productivity of the average worker in this country.

One common type of these computer systems permits an operator to interactively control manufacturing and/or industrial and/or other processes by entering information into the computer during such processes to thereby control the process. Some interactive systems facilitate this operator control by permitting the operator to evaluate status information shown on a display screen, such as a cathode ray tube or liquid crystal display or any other associated display device, and then selectively touching points on the screen to interact with the system. Such interactive systems have become increasingly prevalent in most major food processing plants.

An example of a common interactive touch input system is one that provides an arrangement of radiation or infrared emitters and corresponding detectors in pairs. That is, a line of infrared light emitters are usually arranged along two adjacent sides (i.e. one vertically and the other horizontally abutting) along the outer periphery of the display screen with the other line of detectors arranged oppositely. Other types of sensors are available as well including acoustic and optical that work similarly.

This arrangement of emitters and corresponding detectors produces a grid of light over the screen. When an operator intersects the grid by inserting their finger or another object therein to penetrate the light grid, the computer subsequently determines the grid location of the intersection. Of course, the computer could be replaced by hard-wired display electronics or the like. Once an intersection is detected, the grid intersection information is correlated to a control algorithm with subsequent process activity.

This sophisticated control system is in widespread use and it has proven resilient in most environments. However, a problem has arisen with respect to the use of such systems in the exceptionally harsh operating environments, for example those of large food processing plants and particularly plants processing poultry and the like. These automated control systems are subject to various foreign objects including the processed food items, grease, moisture, corrosive contaminants, and liquids including especially water and harsh cleaning solutions.

As will be appreciated by those skilled in the art, contamination of the display and/or display cover is particularly a problem in computer systems that use touch input. The operator constantly touches the device during normal operations and many such touches are not soft as they often occur during situations where speed of control and adjustment to the process are critical and operator stress is correspondingly elevated.

Moreover, in the food processing industries, the processing equipment including the sensor control screens are cleaned regularly, normally on a daily basis. Such cleaning often subjects the touch screen to prolonged exposure to various cleaning fluids, liquids and/or solutions. The cleaning fluids can cause additional reactions with the display elements. Even more destructive is the use of high pressure water/cleaning fluid solutions directly upon the display element including all of its periphery.

As can be imagined, a permanent liquid tight seal is required to shield the internal sensitive electronic display elements from exposure and destruction by these forces.

Prior art techniques have attempted to solve this problem in several ways. Multiple gaskets between the lens filter and the machine cover and housing have been attempted to address the leakage problem. However, even multiple gaskets can leak after exposure to harsh cleaning fluids and the additional assembly steps required for extra gaskets can be time-consuming. The use of multiple gaskets can also require multiple operations and parts which can make front covers using such gaskets more expensive to manufacture. Exposed gaskets also can leak after a relatively short period of time due to the expansion and contraction of the gasket itself due to temperature changes in the environment and exposure of the gasket material to the harsh cleaning chemicals and high pressure cleaning solutions normally used in food processing plants.

Another attempted solution involves using a transparent polycarbonate material. Such material is fused to a plastic cover by injection molding and then mechanically mated with a glass or other transparent material as the rear viewscreen. These devices are subject to failure in the hash operating environments of food processing plants as well. Varying thermal expansion and contraction rates for the various components causes them to eventually warp and distort or crack. Consequently, a watertight seal is often impossible to maintain and fluid penetration of the cover invariably occurs.

Thus, a need exists for an improved, unitary lens for a touch sensing device that effectively resists short bursts of high pressure cleaning solutions, harsh chemicals and caustic conditions while maintaining a sufficient level of protection for sensitive internal components.

SUMMARY OF THE INVENTION

In accordance with one exemplary embodiment of the present invention, a durable unitary shielding lens is provided for use with a responsive display device for associated control process equipment where the operator may manipulate the equipment through the responsive display device, which device may include touch sensitive devices, optical devices, acoustic devices and the like. In one exemplary embodiment, a touch sensitive display device is used, which device includes a display such as a cathode ray tube (crt) or liquid crystal display (lcd).

A front cover captivates the unitary lens filter. The lens filter includes a frame with an integral mounting bezel that supports an integral reinforcing lens peripherally abutting and supporting a substantially transparent rear filter behind which a conventional crt, led or similar display may be viewed. In typical installations, the crt or led displays process information and the like.

The front cover captivates the interior bezel to secure the lens to an associated control process device housing such as a conventional form, fill and seal machine used in some food processing lines. The front cover is penetrated by several screws, bolts or similar fasteners that secure it to the machine. The front cover is preferably of metal or a similar rigid construction. The front cover compressibly captivates the assembly to the machine housing to secure the lens filter thereto in a sealed fashion.

The entire lens filter may preferably be molded or otherwise formed (vacuum forming is possible) from a hard setting polycarbonate composition including glass fibers or another semi-rigid material. The lens filter bezel seats between the front cover and the machine or the back cover if pendant mounted. A gasket or a similar structure may be provided at the juncture between the front cover and the bezel to prevent water entry therein. The integral rear lens filter is setoff from the bezel inwardly and rearwardly by the reinforcing lens or collar to promote efficient water departure from the rear lens filter. The bezel periphery extends beyond the outermost peripheral edge of the rear lens to dissipate forces exerted thereon.

A support assembly including the front cover and an internal lens retainer permits the installation of the lens filter to the machine to be compressible to seal the junction. The front cover and lens retainer captivate the lens filter therebetween to secure the assembly to the machine.

The unitary lens filter thus provides a mechanical lock that prevents liquids from seeping or entering from the front and thereby protects the touch sensitive display device and the internal components of the associated process control equipment. The lens filter is durable and preferably of unitary construction and molded simultaneously.

Thus, a principal object of the present invention to provide a unitary lens that protects a process control device from destruction by water penetration during high pressure exposure.

Another object of the present invention is to provide an assembly that is easily attachable to a touch sensitive display device for use therewith.

Yet another object of the present invention to provide a unitary lens filter that is easier to manufacture.

Another object of the present invention is to provide a protective cover that resists thermal expansion and contraction due to ambient temperature changes without deleterious deformations while also maintaining an effective seal to prevent contamination.

Yet another object of the present invention is to provide a lens filter and retention assembly permitting the user to compressibly seat the lens filter to an associated machine to ensure an impenetrable seal therebetween.

A further object of the present invention is to provide a front cover that provides a liquid tight seal even when exposed to streams of high pressure water.

An object of the present invention is to provide a cover that is easily cleaned.

Another object of the present invention is to provide a unitary molded lens filter that is easier to manufacture than gaskets or joined parts that may require secondary operations like trimming and finishing.

These and other objects and advantages of the present invention, along with features of novelty appurtenant thereto, will appear or become apparent in the course of the descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
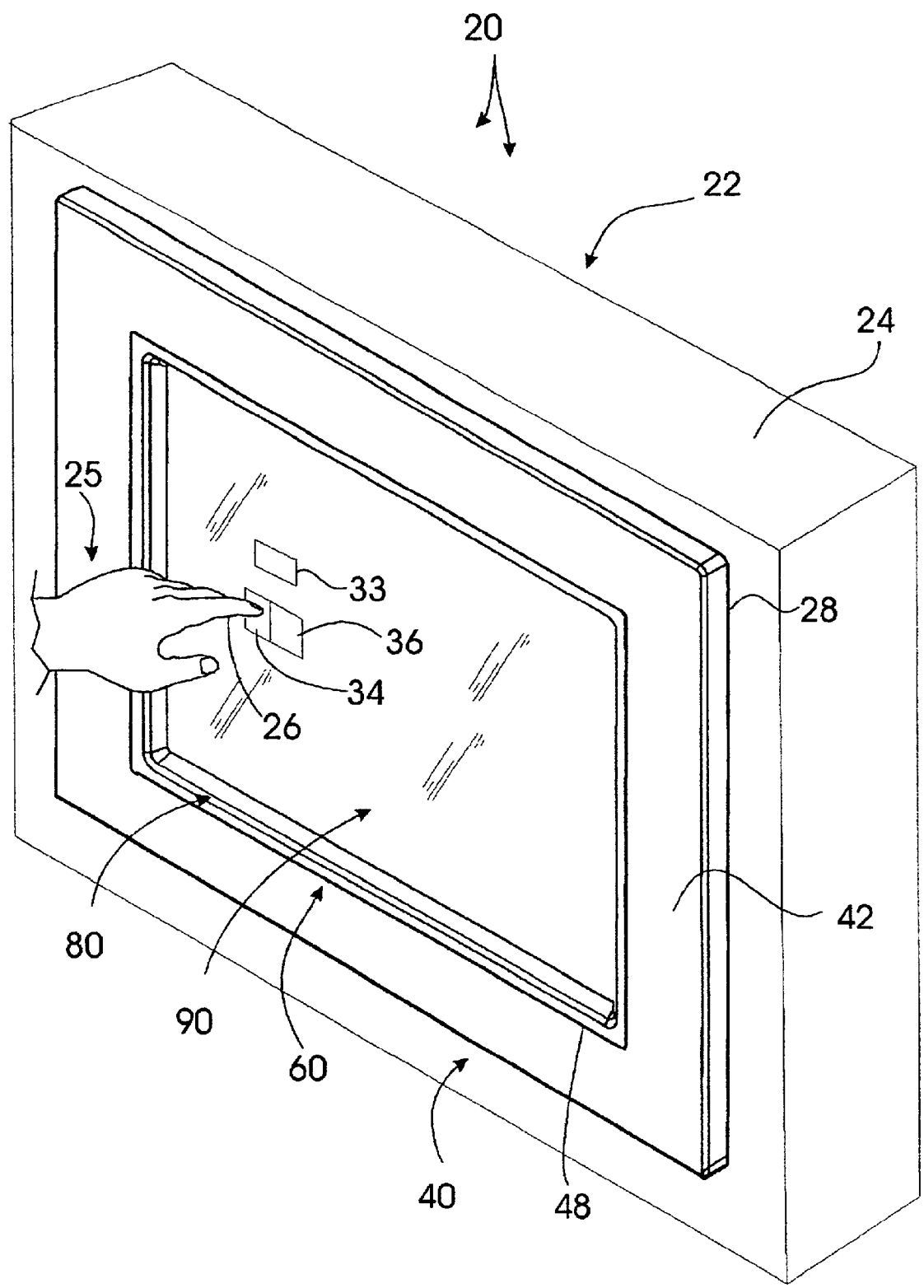
FIG. 1 is an environmental view showing an embodiment of the unitary molded lens filter for touch screen interface in accordance with the present invention.
Figure 2:
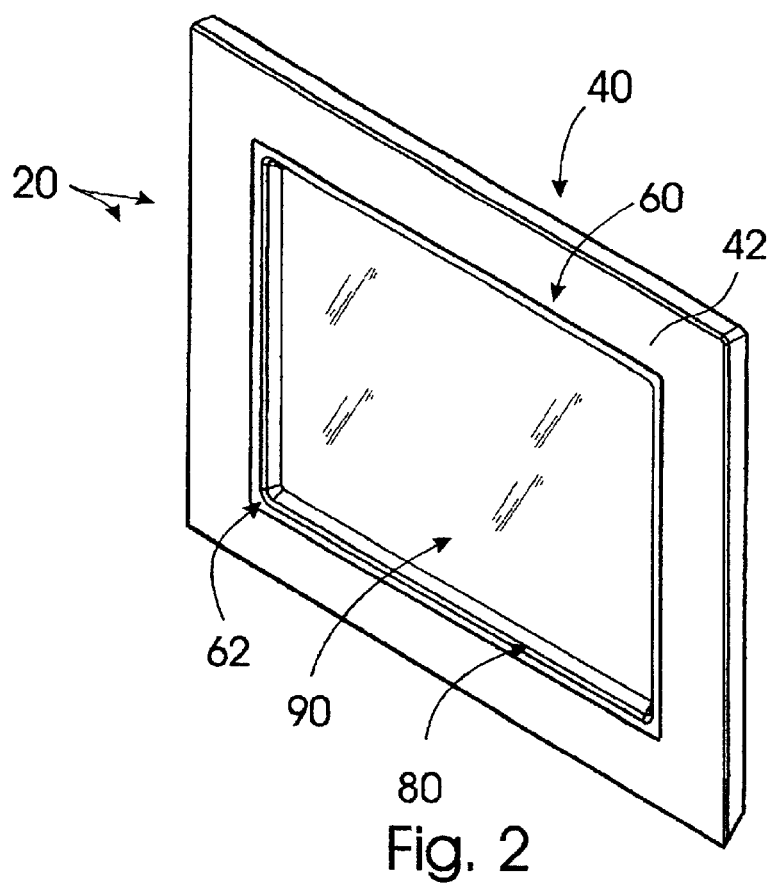
FIG. 2 is a perspective view taken generally from the front thereof.
Figure 3:
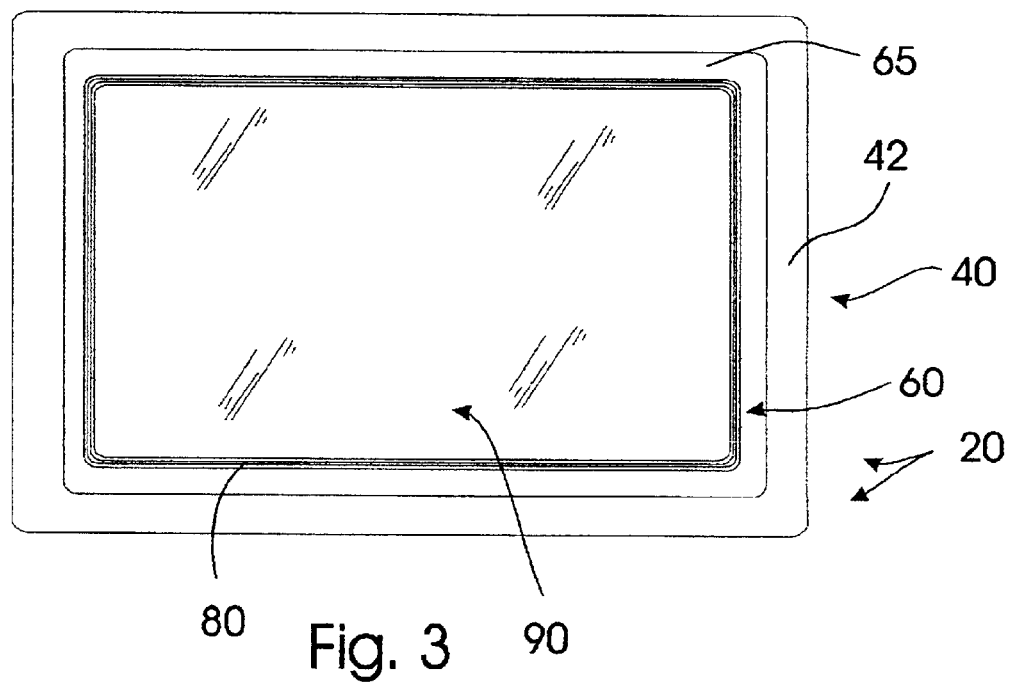
FIG. 3 is a front elevational view thereof.
Figure 4:
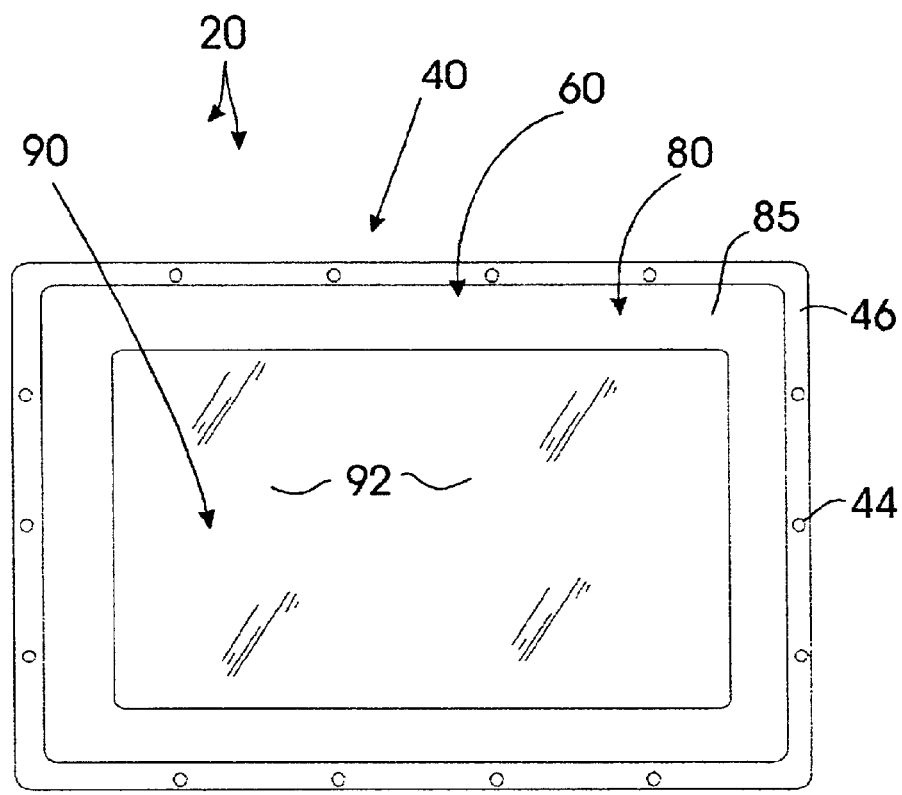
FIG. 4 is a side elevational view thereof.
Figure 5:
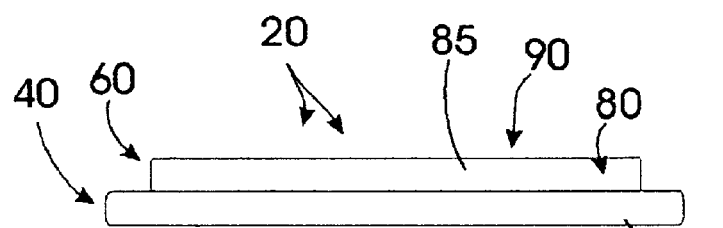
FIG. 5 is a rear elevational view thereof.
Figure 6:
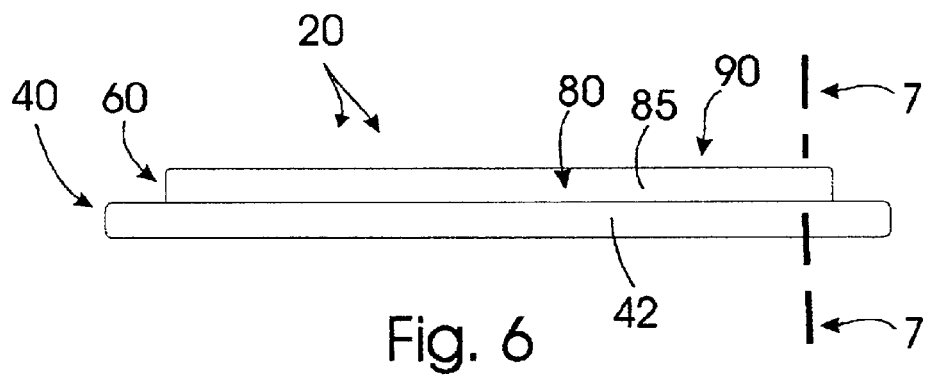
FIG. 6 is a top plan view thereof.

As can be seen in FIGS. 1–7, one exemplary embodiment of the present invention encompassing an unitary molded lens filter for a touch screen interface is generally designated by reference numeral 20. The lens filter 20 provides a durable shielding lens for use with an associated control process machine 22 with sensitive internal electronic circuitry.

In one exemplary embodiment, the machine 22 includes a conventional computer including a microprocessor, associated electrical circuitry and a display device to communicate process information to an operator.

The machine 22 preferably utilizes a touch sensitive display device 30 in a housing 24 with an central access port through which an operator 25 can monitor and control the machine 22 with the insertion of a finger 26 or the like into the access port 28 (FIG. 1). Of course, other types of sensing devices are known to those skilled in the art and such sensing devices could be alternatively employed and those skilled in the art will understand that such is within the scope of the present invention.

The touch sensitive display device 30 preferentially includes an interior display 32, such as a cathode ray tube (crt) or liquid crystal display (lcd) or other conventional display device. The display 32 exhibits various control information 33 for the operator 25 to review in order to determine when to interact with the machine 22 to change an operating parameter 34, 36 by touching the screen. For example, the display may show the temperature (box indicated by reference numeral 33) at which the machine is operating and the operator may control the temperature by touching a portion of the screen to either raise the temperature (box indicated by reference numeral 34) or lower the temperature (box indicated by reference numeral 36). Many modern industrial process machines are controlled in such a manner in most conventional food processing plants.

The display device 30 includes the display 32 along with an adjacent receptor, such as touch sensitive device or sensor 35. Sensor 35 can include acoustic, optical, or similar emitting and receiving arrangements that are adapted to receive operator control input. The sensor 35 includes a parallelepiped frame that defines an open center. Upon the top and an adjacent side of the frame are mounted banks of radiation emitters 38, preferably infrared although other conventional sensing devices could be employed such as acoustic wave emitter, mechanical touch sensor or the like, and oppositely, on the bottom and the other side, are mounted corresponding banks of receivers. The banks of emitters project a constant rectangular grid to the banks of receivers. The operator manipulates control input by inserting an object, such as finger 26, into the grid to interrupt the reception of a particular group of receivers. Such interruption is subsequently correlated into a control instruction by the sensor and appropriate control signals are then transmitted to the associated machine 22 for subsequent action thereby.

The display device 30 is shielded from contaminants and other destructive forces by a front cover 40 that captivates a protective lens filter 60 against an internal lens retainer assembly 50. The front cover 40 also secures the entire lens filter assembly 60 to the machine housing 24.

Figure 7:
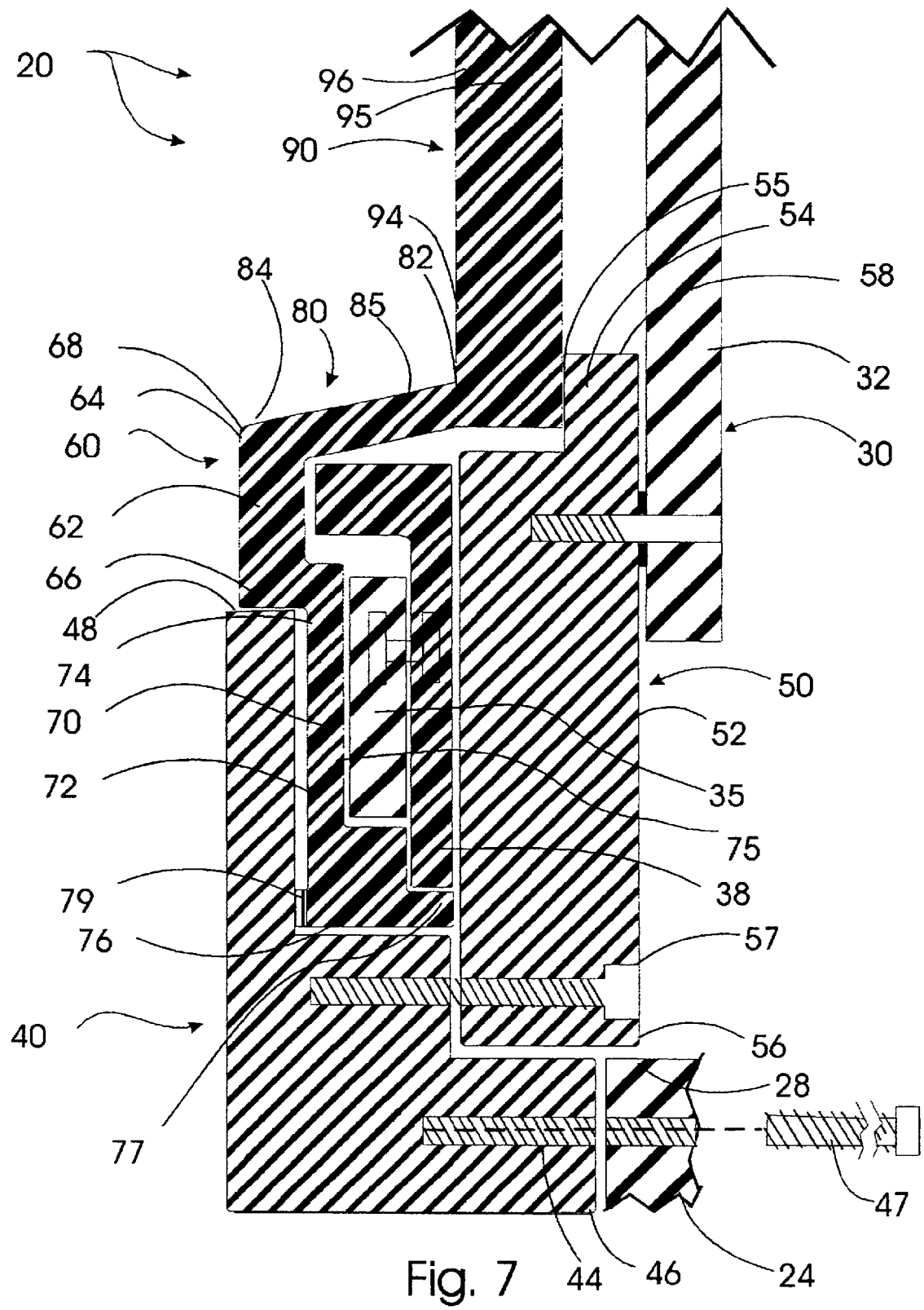
FIG. 7 is a partial cross-sectional view thereof taken along line 7—7 of FIG. 6.

The lens retainer assembly 50 includes a generally parallelepiped frame 52 defining a top 54 and a spaced apart bottom 56 (FIG. 7). The top includes an in inner ledge 55 adapted to seat a portion of the lens 60. The bottom includes a plurality of holes 57 through which screws, bolts or the like penetrate to secure the retainer 50 to the front cover 40. Thus, the retainer 50 may be tightened by the bolts against front cover 40 as necessary to seat and seal the lens 60.

The frame 52 further supports the display 32 using conventional mounting screws, bolts or the like along with appropriate isolation washers and the like. The frame 52 defines an inner port 58 coaxially aligned with the central port 28 through which the user may view the display 32.

As mentioned previously, the front cover 40 secures the lens 60 to an associated control process device such as a conventional form, fill and seal machine used in some food processing lines. The front cover 40 includes a frame 42. The front cover 40 is penetrated at a rear surface 46 by several bolts 47, screws or similar fasteners that secure in threaded hole 44 to couple it to the machine housing 24. The front cover is preferably of singular construction from metal or some other rigid material. The front cover has a rectangular cross-section that defines an inner, central port 48 that is preferably coaxially aligned with central port 28. The central port 48 permits the operator 25 to view display information 33 and interact with the touch sensitive device (i.e. 34 or 36) protected by lens filter 60.

The lens filter 60 includes an exterior frame 62. Frame 62 is approximately 0.25 to 0.5 inches in width and 0.125 to 0.25 inches in thickness. Frame 65 has a generally rectangular cross-section that defines a central port 68. When installed on a machine 22, the central port 68 is aligned with the central port 28. Frame 62 also includes an inside edge 64 and an outer edge 66. Outer edge 66 integrally mounts to a hidden bezel 70, shown in FIG. 7.

The mounting bezel 70 supports the frame 65 and the peripheral lens that also acts as an intermediate reinforcing collar 80 and an integral substantially transparent rear lens filter 90. The lens filter bezel 70 seats between the front cover 40 and the lens retainer 50.

The mounting bezel 70 includes a body 72 with an inner top 74 and an outer peripheral bottom 76 that is approximately 2 inches in width and approximately 0.125 inches in thickness. At its outermost peripheral edge, a small lip 77 projects rearwardly from the periphery 76. The bezel periphery 76 is somewhat thicker than the bezel and its thickness approaches 0.365 inches while the lip 76 is thicker still by approximately 0.125 inches. A rear surface 75 is adjacent the sensor 30.

A gasket 79 or similar structure is provided at the juncture between the bezel periphery 76 and the inner edge of the front cover 40 to cushion compressive forces therebetween. An optional gasket may also be included between the bezel front 72 adjacent the lens bottom 66 and the cover body 42 to prevent contaminant (such as liquids including water) entry therebetween as well. In some situations, it is sufficient to retain a mold flashing to serve as a gasket or an edgemost lip 77 that extends about the bezel periphery 76 can be utilized as a gasket.

The bezel periphery 76 extends substantially beyond the outermost peripheral edge of the lens collar 80 and the rear lens filter 90 to dissipate forces exerted thereon as well. Thus, the bezel 70 transfers forces exerted on the lens 80 and filter 90 to the housing 24 through the lens retainer 50 and the front cover 40.

The integral rear lens filter 90 is setoff from the bezel 70 and frame 62 inwardly and rearwardly by the integral reinforcing lens or collar 80. Collar 80 promotes efficient water departure from the rear lens 90. Collar 80 includes a body 85 inclined from the rear lens front 94 toward the frame body inside edge 62. Body 85 includes an inner edge 82 and an outer edge 84. The collar 80 has a generally rectangular cross-section that is approximately 0.1 to 0.25 inches in width and approximately 0.25 to 0.5 inches in depth. The collar 80 supports the rear lens 90.

Lens 90 includes a body 95 with an outer surface 94 bordering the lens periphery about the body 95. The body 95 also has an outer flat and substantially transparent front face 96 that is approximately 0.125 to 0.5 inches in thickness. Front face 96 protects the internal components of the machine 22 while permitting the operator to view therethrough. Front face 96 thus covers a conventional crt, led or similar display 32 may be viewed therethrough. Front face 96 may be polarized or otherwise filter the output of the display 32 as well.

As mentioned previously, in typical installations the crt or led displays process information 33 as well as control parameters 34, 36. Thus, the length and height of the front face 96 is dependent upon the measure of the access port 28 but they normally approach six inches by eight inches.

The entire lens filter 60 is preferably molded from a hard setting polycarbonate composition including glass fibers simultaneously. The unitary lens filter 60 thus provides a mechanical lock that prevents liquids from seeping or entering from the front of the machine housing 24 through access port 28 and thereby protects the touch sensitive display device 30 and the other internal components of the associated process control equipment 22.

Moreover, as discussed previously, the lens filter is compressibly seated by the coupling of the internal retainer 50 to the front cover 40. Thus, during installation of the lens filter 60 on equipment 22, the filter 60 may be seated and sealed by tightening the bolts, screws or other retention devices coupling the retainer 50 to the front cover 40 as necessary to prevent undesirable contaminant infiltration.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A unitary lens filter for a responsive display device with associated process control equipment having an internal screen adapted to display process information to facilitate operator control of the process and a sensor adapted to receive operator control input, said lens filter comprising:

a front cover anchoring said lens filter to the process control equipment, said front cover defining a central port through which said display device may be observed by the operator;

a substantially transparent seamless rear lens filter housed in said central port, said seamless rear lens filter permitting an operator to view process control information shown on said display device;

a bezel integral with said seamless rear lens for securing said seamless rear lens to said front cover, said bezel having a periphery extending substantially beyond the periphery of said seamless rear lens and wherein said bezel is formed simultaneously with the formation of said seamless rear lens forming a seamless lens filter shield, and both are formed by molding or forming to form a said lens filter shield impenetrable by high pressure liquids to thereby protect said display device; and, an integral reinforcing lens permitting said sensor to receive operator input therethrough and securing said rear lens periphery to said bezel to stabilize said lens and thereby substantially dissipate any external force including repetitive operator contact to prevent interruption of operator input when the force is inadvertently applied to said rear lens.

2. The unitary lens filter as recited in claim 1 wherein said integral bezel includes a peripheral edge surrounding and captivating the sensor and dissipating forces transferred thereto by said bezel.

3. The unitary lens filter as recited in claim 2 further including an internal lens retainer adapted to captivate said bezel compressibly against said front cover to secure said lens filter to the equipment.

4. The unitary lens filter as recited in claim 3 wherein said sensor comprises an infrared touch input device having opposing banks of emitters and receivers.

5. The unitary lens filter as recited in claim 3 wherein said sensor comprises an acoustic input device having opposing banks of emitters and receivers.

6. The unitary lens filter as recited in claim 3 wherein said sensor comprises an optical input device having opposing banks of emitters and receivers.

7. The unitary lens filter as recited in claim 3 wherein said display comprises a liquid crystal display device or a cathode ray tube display device.

8. An integral display lens filter for an associated process machine adapted to display process information reviewable by an operator, said lens comprising:

a front cover captivating a bezel against an internal lens retainer for securing an integral and substantially transparent rear lens filter and lens to the machine in an operative configuration to display process information through said lens filter and receive operator input through said lens, so said lens filter and said lens are held in place relative to the machine and wherein said bezel is formed simultaneously with the formation of said rear lens filter forming a seamless lens filter shield and wherein said bezel forms a mechanical lock to the machine that provides a liquid tight seal;

an integral reinforcing edge formed about the periphery of the bezel for diffusing a touch force when the touch force is applied to said lens or said rear lens filter;

wherein said reinforcing edge, said bezel, said lens and said internal lens retainer form a housing adapted to protectively captivate a plurality of opposing emitters and receivers disposed around the periphery of said lens, said emitter and receivers forming a grid over said rear lens;

a display disposed behind and adjacent to said lens and adapted to display process information behind said grid; and a controller adapted to interpret interruptions in said grid and providing input coordinates for said interruption;

wherein said front cover is secured to the machine to captivate said lens against the machine to protect said display.

9. The integral display lens filter recited in claim 8 wherein said bezel may be compressibly secured between said cover and said internal retainer to compensate for different rates of expansion and contraction of said cover and said rear lens while maintaining the mechanical lock and liquid seal and wherein said bezel is a unitary member with said lens and said rear lens filter.

10. The integral display lens filter recited in claim 9 wherein said emitters and receivers comprise infrared emitters and receivers.

11. The integral display lens filter recited in claim 9 wherein said emitters and receivers comprise acoustic emitters and receivers.

12. The integral display lens filter recited in claim 9 wherein said emitters and receivers comprise optical emitters and receivers.

13. The integral display lens filter recited in claim 9 wherein said display comprises a liquid crystal display device or a cathode ray tube display device.

14. A computer system display adapted to show process information and receive operator input, said system comprising:

a system unit in a substantially rigid housing with a central access port, said system unit comprising an internal display means for displaying process information in said access port and sensor means for receiving operator input adjacent said display means; and, an exterior lens assembly covering said access port and having a bezel integral with said exterior lens with inner edges describing a lens circumscribing said access port, said bezel made of a polycarbonate material, and an inwardly placed rear lens filter that covers said access port yet permits the displaying of process information therethrough and wherein said lens assembly is adapted to completely prevent liquid entry through said access port, said lens assembly captivated to said housing to provide a liquid tight seal to protect said sensor means.

15. The computer system recited in claim 14 further comprising a front cover captivating said bezel against an internal lens retainer for securing said lens assembly to said housing in an operative configuration to display process information through said lens filter and receive operator input through said lens, so said lens filter and said lens are held in place relative to said housing and wherein said bezel provides a liquid tight seal.

16. The computer system recited in claim 15 wherein said sensor means comprises an infrared touch input device having opposing banks of emitters and receivers.

17. The computer system recited in claim 15 wherein said sensor means comprises an acoustic input device having opposing banks of emitters and receivers.

18. The computer system recited in claim 15 wherein said sensor means comprises an optical input device having opposing banks of emitters and receivers.

19. The computer system recited in claim 15 wherein said display means comprises a liquid crystal display device or a cathode ray tube display device.

* * * * *